United States Patent Office 3,816,421
Patented June 11, 1974

---

3,816,421
DIHYDROISAZOLOPYRIMIDINE HERBICIDES
Loren Kenneth Gibbons, Medina, and Arthur Albert Ramsey, Middleport, N.Y., assignors to FMC Corporation, New York, N.Y.
No Drawing. Filed Oct. 15, 1971, Ser. No. 189,781
Int. Cl. C07d 51/46
U.S. Cl. 260—256.4 F    9 Claims

ABSTRACT OF THE DISCLOSURE

Certain 3,6-dialkyl-6,7-dihydroisazolopyrimidin-4(5H)-ones, specifically 3,6-dialkyl-6,7-dihydroisoxazolo[5,4-d]pyrimidin-4(5H)-ones, 3,6-dialkyl-6,7-dihydroisothiazolo[5,4-d]pyrimidin - 4(5H) - ones, 3,6-dialkyl-6,7-dihydroisoxazolo[3,4-d]pyrimidin-4(5H)-ones, and 3,5-dialkyl-6,7 - dihydroisothiazolo[3,4-d]pyrimidin-4(5H)-ones, exhabit pre-emergence and post-emergence herebicidal activity, controlling effectively a wide spectrum of grassy and broad-leafed plants. The synthesis of tert-butyl-6,7-dihydro - 6 - methylisoxazolo[3,4-d]pyrimidin-4(5H)-one and other members of this class is described in detail, and the utility of representative compounds is exemplified.

BACKGROUND OF THE INVENTION

Field of the invention

This invention pertains to the general field of herbicides, and particularly to compositions which control plant growth.

Description of the prior art

Analogous herbicidal compounds are described in co-pending U.S. Patent Application Ser. No. 31,414, filed Apr. 23, 1970 now U.S. Pat. 3,679,682, and Ser. No. 189,779 and Ser. No. 189,780 both filed Oct. 15, 1971.

Neither the dihydroisazolopyrimidinones of the present invention, nor the outstanding plant responses in pre-emergence and post-emergence herbicidal activity of the compounds of the present invention, have been previously reported or suggested in the art.

SUMMARY OF THE INVENTION

This invention relates to novel herbicidal compounds, to new herbicidal compositions, and to new methods for the control of undesired plant growth by pre-emergence and post-emergence application of said new and useful herbicidal compositions.

The novel herbicidal compounds of this invention are substituted dihydroisazolopyrimidines. The structure of these compounds is given in the following formula:

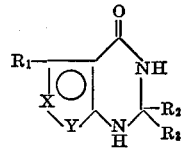

in which $R_1$ and $R_2$ are the same or different members of the group consisting of straight and branched lower aliphatic radicals (1 to 4 carbon atoms), $R_3$ is hydrogen or a member of the group consisting of straight and branched lower aliphatic radicals (1 to 4 carbon atoms), X is a member of the group consisting of N, O, and S, and Y is a member of the group consisting of O and S when X is N, and Y is N when X is O or S.

Effective herbicidal control of the growth of a wide variety of grassy and broad-leafed plant species is obtained at rates as low as one pound per acre. The herbicidal compositions may be applied and utilized by commonly accepted methods.

DETAILED DESCRIPTION OF THE INVENTION AND THE PREFERRED EMBODIMENTS

The new class of herbicidal compounds of this invention has the formula:

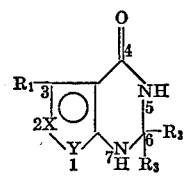

in which $R_1$ and $R_2$ are the same or different members of the group consisting of straight and branched lower aliphatic radicals (1 to 4 carbon atoms), $R_3$ is hydrogen or a member of the group consisting of straight and branched lower aliphatic radicals (1 to 4 carbon atoms), X is a member of the group consisting of N, O, and S, and Y is a member of the group consisting of O and S when X is N, and Y is N when X is O or S.

When X is N and Y is O, the compounds are dihydroisoxazolo[5,4-d]pyrimidin-4-ones; when X is N and Y is S, the compounds are dihydroisothiazolo[5,4-d]pyrimidin-4-ones. When Y is N and X is O, the compounds are dihydroisoxazolo[3,4-d]pyrimidin-4-ones; when Y is N and X is S, the compounds are dihydroisothiazolo[3,4-d]pyrimidin-4-ones.

The preparation of the new compounds of this invention may be conveniently carried out from readily available materials. Methods of synthesis are illustrated by the following schema wherein a herbicidal dihydroisazolopyrimidinone is designated IV, and $R_1$, $R_2$, $R_3$, X and Y have the significance set forth above.

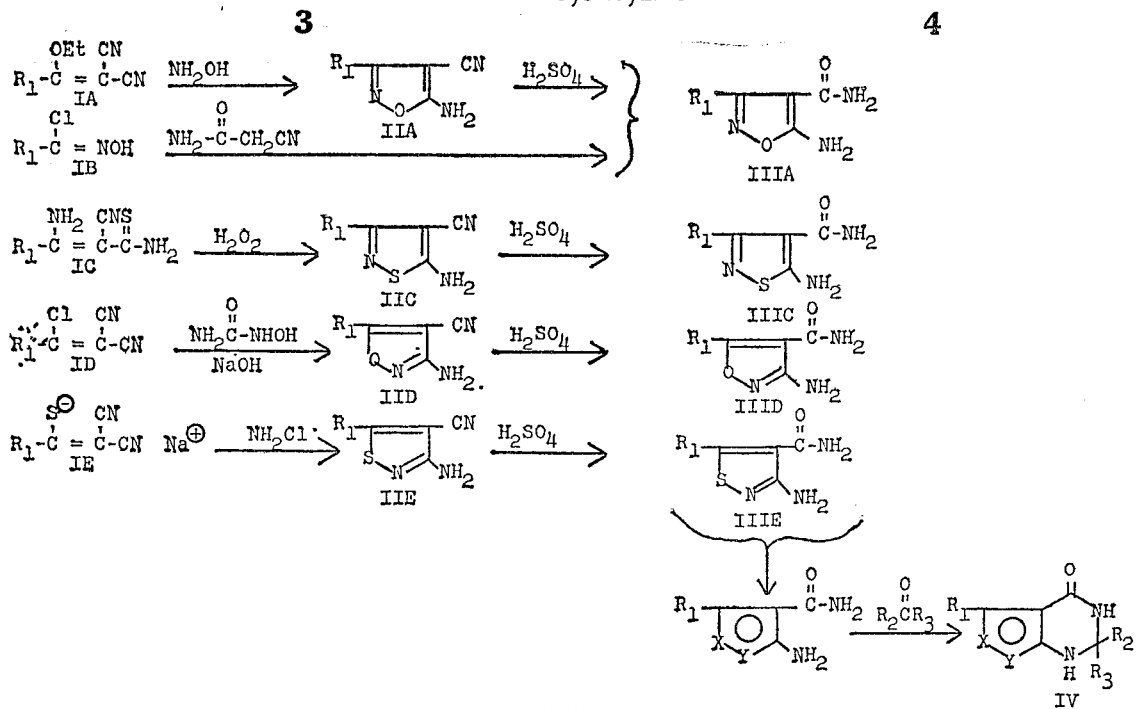

It is seen that 4-carboxamides of 5-amino - 3 - alkylisoxazole and 5 - amino - 3 - alkylisothiazole, and 3-amino - 5 - alkylisoxazole and 3 - amino - 5 - alkylisothiazole are prepared by diverse routes and caused to react with aldehydes or ketones to form the desired dihydroisoxazolopyrimidinone or dihydroisothiazolopyrimidinone.

Methods for preparing intermediates used in the synthesis of the isoxazolo- and isothiazolopyrimidinones of this invention have not in every case been previously described. In order that the new compounds of this invention may be readily available to those skilled in the art, the methods for preparation of those intermediates used in the examples are summarized briefly (if previously described) or set forth in detail (if not previously described). The examples describing the synthesis of the isoxazolo- and isothiazolopyrimidinones follow the description of the preparation of the appropriate intermediates. All temperatures are in degrees centigrade. All reduced pressures not otherwise designated are the pressure normally attainable using a water aspirator.

The method described by Taylor and Garcia in J. Org. Chem. 29, 2116 (1964) was used to prepare 5-amino-3-alkylisoxazole - 4 - carboxamides (IIIA in the schema). Trialkyl orthoalkenoate was reacted with malononitrile to obtain the corresponding 2 - cyano - 3 - alkoxy-2-alkenenitrile (IA) which was condensed with hydroxylamine to yield 5 - amino - 4 - cyano - 3 - alkylisoxazole (IIA). This was converted to the corresponding carboxamide by acid hydrolysis. The following compounds were prepared:

5-amino-3-methylisoxazole-4-carboxamide, M.P. 185–190°

5-amino-3-ethylisoxazole-4-carboxamide, M.P. 195–197°

5-amino-3-propylisoxazole-4-carboxamide, M.P. 144–146°.

Another procedure for obtaining 5-amino-3-alkylisoxazole-4-carboxamides is to condense an alkylhydroximoyl chloride (IB) with cyanoacetamide as described in the following example:

EXAMPLE I

5-Amino-3-*tert*-butylisoxazole-4-carboxamide

A solution of 800 g. of 2,2-dimethylpropionaldoxime in 1600 ml. of methylene chloride was added to a mixture of 5600 g. of crushed ice and 2400 ml. of concentrated hydrochloric caid. While the mixture was stirred vigorously, 560 g. of chlorine gas was introduced during one hour while maintaining the temperature below 0°. Stirring was continued one hour at 0° after addition was complete. The organic layer was separated and the aqueous layer extracted repeatedly with small volumes of methylene chloride. The methylene chloride solutions were combined, washed with cold water and with cold saturated salt water and dried over calcium chloride. The dried solution was filtered and the filtrate concentrated by evaporation of about one-fourth its volume to give a solution of 2,2 - dimethylpropionohydroximoyl chloride which was used without further purification.

A solution of the sodium salt of 2-cyanoacetamide was prepared by adding 674 g. of 2-cyanoacetamide to a mixture of 3,360 g. of 16.97 percent sodium ethylate and 6000 ml. of absolute ethanol. This solution was stirred for two hours at room temperature, then cooled and maintained below 20° while the methylene chloride solution of 2,2 - dimethylpropionohydroximoyl chloride (described above) was added. The reaction mixture was heated under reflux for two hours, then allowed to stand overnight. The solvent was removed by evaporation under reduced pressure at about 50° and the residue further dried using a vacuum pump at 2 mm. The solid was slurried with approximately 1600 ml. of water, collected on a filter and again slurried with water. The collected solid was dried to constant weight under reduced pressure at 50–60° to give approximately 1000 g. of 5-amino-3-*tert*-butylisoxazole-4-carboxamide, M.P. 150–152°.

In the same manner, except that sodium methylate in diemthylformamide replaced the ethanolic sodium ethoxide, was prepared 5 - amino - 3 - isopropylisoxazole-4-carboxamide, M.P. 19–182°.

To prepare 5 - amino - 3 - alkylisothiazole-4-carboxamides (IIIC in the schema), the method of Taylor and Garcia, ibid, was used to obtain the appropriate 2-cyano-3-alkoxy - 2 - alkenenitrile, which was converted, via the corresponding 3-amino - 2 - cyano - 2 - alkenethiocarboxamide and 3-alkyl - 5 - amino - 4 - cyanoisothiazole, to the 3 - alkyl - 5 - aminoisothiazole - 4 - carboxamide as described in the following examples:

EXAMPLE II

3-Amino-2-cyano-2-pentenenitrile

Maintaining the temperature of the solution below 50°, 51 g. of ammonia gas was passed into a solution of 150 g. of 2-cyano - 3 - ethoxy - 2 - pentenenitrile in 100 ml. of ethanol and the reaction mixture stirred for one hour at ambient temperature. The dark solution was concentrated by evaporation under reduced pressure. The residual solid was recrystallized from ethanol-water to give 81 g. of 3-amino-2-cyano-2-pentenenitrile, M.P. 166–168°.

In the same manner were prepared:

3-amino-2-cyano-2-butenenitrile, M.P. 215–217°;
3-amino-2-cyano-2-hexenenitrile, M.P. 133–135°;
3-amino-2-cyano-4-methyl-2-pentenenitrile, M.P. 187–189°;
3-amino-2-cyano-4,4-dimethyl-2-pentenenitrile, M.P. 163–165°.

EXAMPLE III 3-amino-2-cyano-2-pentenethiocarboxamide

Hydrogen sulfide gas (about 39 g.) was passed into a mixture of 69 g. of 3-amino-2-cyano-2-pentenenitrile and 57.5 g. of triethylamine in 70 ml. of pyridine. The reaction was mildly exothermic. The reaction mixture was heated at 50° for one hour, then chilled in an ice-bath and poured into 400 ml. of ice-water. The solid was collected on a filter, washed with water and recrystallized from methanol-water to give 58.7 g. of 3-amino-2-cyano-2-pentenethiocarboxamide, M.P. 104–107°. The IR spectrum of the compound was consistent with the assigned structure.

In the same manner were prepared:

3-amino-2-cyano-2-butenethiocarboxamide, M.P. 180–182°;
3-amino-2-cyano-2-hexenethiocarboxamide, M.P. 85–88°;
3-amino-2-cyano-4-methyl-2-pentenethiocarboxamide, M.P. 114–116°;
3-amino-2-cyano-4,4-dimethyl-2-pentenethiocarboxamide, M.P. 129–133°.

EXAMPLE IV 5-amino-4-cyano-3-ethylisothiazole

Into a solution of 53.7 g. of 3-amino-2-cyano-2-pentenenitrile in 500 ml. of ethanol was slowly added 39.7 g. of 30 percent hydrogen peroxide. The exothermic reaction increased the temperature to about 50°. The mixture was stirred at ambient temperature for two hours, then heated to reflux. The yellow solution was filtered and concentrated to about one-half volume by evaporation under reduced pressure. The solid which separated was collected and recrystallized from ethanol-water to give 51.2 g. of 5-amino-4-cyano-3-ethylisothiazole, M.P. 148–151°.

In the same manner were prepared:

5-amino-4-cyano-3-methylisothiazole, M.P. 205–208°;
5-amino-4-cyano-3-propylisothiazole, M.P. 169–172°;
5-amino-4-cyano-3-isopropylisothiazole, M.P. 133–136°;
5-amino-4-cyano-3-*tert*-butylisothiazole, M.P. 133–135°.

EXAMPLE V 5-amino-3-ethylisothiazole-4-carboxamide

A mixture of 51.2 g. of 5-amino-4-cyano-3-ethylsothiazole and 200 ml. of concentrated sulfuric acid was heated on a steam bath for one hour then poured into one liter of crushed ice. The aqueous mixture was made basic by adding excess concentrated ammonium hydroxide. The solid which separated was collected on a filter, washed with water and dried. Recrystallization from ethanol-water gave 50.9 g. of 5-amino-3-ethylisothiazole-4-carboxamide, M.P. 138–140°. The IR and NMR spectra of the product were consistent with the assigned structure.

In the same manner were prepared:

5-amino-3-methylisothiazole-4-carboxamide, M.P. 167–169°;
5-amino-3-propylisothiazole-4-carboxamide, M.P. 190–193°;
5-amino-3-isopropylisothiazole-4-carboxamide, M.P. 198–200°.

The appropriate 3-amino-5-alkylisoxazole-4-carboxamides (IIID of schema) were obtained by cyclization of 3-chloro-2-cyano-2-alkenenitriles with hydroxyurea. The 3-chloro-2-cyano-2-alkenenitriles were obtained by chlorination ($PCl_5$) of the appropriate 2-cyano-3-hydroxy-2-alkenenitrile. The latter hydroxy-compound was prepared by hydrolysis of the corresponding 2-cyano-3-alkoxy-2-alkenenitrile, prepared by the method of Taylor and Garcia, *supra*, or, alternatively by reaction of malononitrile with the appropriate acid anhydride. This series of reactions is described in the following examples:

EXAMPLE VI 2-cyano-3-hydroxy-2-hexenenitrile

A solution of 132.1 g. of malononitrile in 2½ liters of anhydrous ether was placed in a five-liter three-neck flask equipped with mechanical stirrer, thermometer, addition funnel and condenser with drying tube. To this was added 331.7 g. of potassium carbonate and the mixture was stirred for five minutes before beginning addition of butyric anhydride. During a two-hour period, 506.2 g. of butyric anhydride was slowly added, the reaction being exothermic. The reaction mixture was refluxed for one hour, cooled to about 15° and poured over 1½ liters of ice-water. The aqueous solution was acidified with concentrated hydrochloric acid and then extracted with ether. The ethereal extract was washed with saturated sodium chloride solution, dried ($Na_2SO_4$) and concentrated under reduced pressure at room temperature. The product was isolated by distillation using a "falling film" molecular still (column temperature 85–90° and pressure of 17 mm. Hg) to give 76.5 g. of 2-cyano-3-hydroxy-2-hexenenitrile which was used without further purification. The IR and NMR spectra were consistent with the assigned structure. Recrystallization of a small amount from another preparation, using benzene-ligroin (30–60°), gave a solid, M.P. 63–64.5°.

In the same manner were prepared:

2-cyano-3-hydroxy-4-methyl-2-pentenenitrile, M.P. 93–95°;
2-cyano-3-hydroxy-4,4-dimethyl-2-pentenenitrile, M.P. 164–166°.

EXAMPLE VII 3-chloro-2-cyano-2-hexenenitrile

A solution of 49.5 g. of 2-cyano-3-hydroxy-2-hexenenitrile in 500 ml. of benzene was placed in a one-liter flask equipped with mechanical stirrer, gas trap and condenser with drying tube. The solution was cooled with an ice-bath and 75.7 g. of phosphorus pentachloride was added, in portions, over a 15 minute period. The mixture was stirred for three hours at about 5° and stirred at room temperature overnight. After refluxing for one hour, the mixture was cooled to about 5°, sulfur dioxide gas was passed through the mixture for 45 minutes and the mixture stirred for an additional two hours at 5°. The mixture was allowed to warm and then was concentrated at 35° under reduced pressure to remove volatile materials. Product was collected by distillation to give 35 g. of 3-chloro-2-cyano-2-hexenenitrile; B.P. 100–110°/18 mm. Hg. The identity of the product was verified by its NMR spectrum.

In the same manner were prepared:

3-chloro-2-cyano-2-butenenitrile, B.P. 96–98°/27 mm. Hg;
3-chloro-2-cyano-2-pentenenitrile, B.P. 91–92°/18 mm. Hg;
3-chloro-2-cyano-4-methyl-2-pentenenitrile, B.P. 97–99°/17 mm. Hg;
3-chloro-2-cyano-4,4-dimethyl-2-pentenenitrile, M.P. 54°, B.P. 115–116°/15 mm. Hg.

EXAMPLES VIII

N-Hydroxyurea

N-Hydroxyurea was prepared as follows: A solution of 400 g. of sodium hydroxide in 2 liters of water was placed in a five-liter flask equipped with mechanical stirrer and condenser. In this was dissolved 416 g. of hydroxylamine hydrochloride after which 445.2 g. of ethyl carbamate were added and the reaction mixture was stirred at room temperature for several days. The solution can be used per se or the hydroxyurea isolated as follows. The solution was chilled, neutralized by concentrated hydrochloric acid and then washed with a liter of ether. Solvent was evaporated from the aqueous solution under reduced pressure and the residue was washed with hot ethanol. The residue was then extracted with ethanol in a Soxhlet apparatus for about 48 hours. The alcoholic extract was concentrated under reduced pressure to a solid. The solids recovered from alcoholic extraction were recrystallized from ethanol and dried to give 180 g. of N-hydroxyurea; M.P. 142–144°. An additional 76.4 g. of product were recovered from recrystallization filtrates.

EXAMPLE IX

3-Amino-4-cyano-5-propylisoxazole

To a solution of 2.8 g. of sodium hydroxide in 30 ml. of water, in a 100 ml. flask equipped with mechanical stirrer, condenser and addition funnel, was added 5.3 g. of N-hydroxyurea. A solution of 10.8 g. of 3-chloro-2-cyano-2-hexenenitrile in 5 ml. of ethanol was added slowly while maintaining the temperature of the reaction mixture below 30°. The reaction mixture was stirred overnight at room temperature and then refluxed for one hour. The mixture was cooled to room temperature and the product isolated by filtration. The solid was dissolved in ethanol and the solution treated with decolorizing charcoal. The solution was cooled slowly to room temperature and the solid which separated was isolated by filtration. Recrystallization from ethanol-water (1:1) gave 3-amino-4-cyano-5-propylisoxazole; M.P. 105–107°. Additional product (M.P. 104–106°) was obtained from the recrystallization filtrate to give a total of 4.5 g. of product. The identity was verified by the NMR spectrum.

In this manner, also were prepared:

3-amino-4-cyano-5-methylisoxazole, M.P. 173–174°;
3-amino-4-cyano-5-ethylisoxazole, M.P. 110–112°;
3-amino-4-cyano-5-isopropylisoxazole, M.P. 64–65°;
3-amino-4-cyano-5-tert-butylisoxazole, M.P. 87–88°.

EXAMPLE X

3-Amino-5-propylisoxazole-4-carboxamide

A mixture of 5.6 g. of 3-amino-4-cyano-5-propylisoxazole and 30 ml. of concentrated sulfuric acid was heated at 100° for one hour with good stirring. The hot solution was poured into 300 ml. of ice-water and the aqueous mixture made basic by adding concentrated ammonium hydroxide. The solid was isolated on a filter, washed with water and dried to give 5.0 g. of 3-amino-5-propylisoxazole-4-carboxamide, M.P. 110–112°. Recrystallization from ethanol increased the melting point to 111–112°. The IR spectrum of the product was consistent with the assigned structure.

In this manner was also prepared:

3-amino-5-tert-butylisoxazole-4-carboxamide, M.P. 146–147°.

The 3-amino-5-alkylisothiazole-4-carboxamides (IIIE of schema) were prepared by a series of reactions beginning with methyl dithioalkanoate prepared by the method of Mayer, Scheithauer and Kunz (Chem. Ber. 99, 1393 (1966)). The dithioalkanoate was reacted with malononitrile according to the method of Hartke and Peshkar (Archiv. Pharm. 301, 601 (1968)) to form the sodium salt of the corresponding 2-cyano-3-mercapto-2-alkenenitrile. Reaction of that sodium salt with chloramine gave the 5-alkyl-3-amino-4-cyanoisothiazole which was readily hydrolyzed to the corresponding isothiazole-4-carboxamides. These reactions are described in the following examples.

EXAMPLE XI

Methyl dithioisobutyrate

To a solution of 138.2 g. of isobutyronitrile in 500 ml. of benzene was added 126.2 of methyl mercaptan, maintaining the temperature at about 0° during addition. Hydrogen chloride was bubbled through the mixture for three hours, maintaining the temperature at −8 to 0°. The mixture was allowed to stand overnight, then the solvent was removed by evaporation under reduced pressure. The solid residue was treated with 600 ml. of cold pyridine which had been saturated with hydrogen sulfide. The mixture was then stirred for 6 hours at 0° while hydrogen sulfide was bubbled through. Two hundred-fifty ml. of water and 250 ml. of hydrochloric acid were added and, after gas evolution ceased, the mixture was extracted with three 400-ml. portions of ether. Ether extracts were combined, washed with 400 ml. of water and dried (MgSO₄). Volatile materials were removed under reduced pressure. Distillation of the residue gave 277.8 g. of methyl dithioisobutyrate; B.P. 48–51°/8 mm. Hg.

In the same manner were prepared:

methyl dithiobutyrate, B.P. 76°/29 mm. Hg;
methyl dithiotrimethylacetate, B.P. 65–67°/12 mm. Hg.

EXAMPLE XII

3-Amino-4-cyano-5-isopropylisothiazole

A solution of sodium ethoxide was prepared by dissolving 8.9 g. of sodium in 380 ml. of absolute ethanol. The solution was cooled to room temperature and 24.6 g. of malononitrile in 20 ml. of ethanol and 50 g. of methyl dithioisobutyrate were added simultaneously. The reaction mixture was heated under reflux for three hours, then allowed to stand overnight at room temperature. The solvent was removed by evaporation under reduced pressure and the residual salt used without further purification.

The salt was dissolved in 200 ml. of water and the solution was added to a cold (0°) mixture of chloramine prepared by mixing one liter of 1 N ammonium hydroxide and 1270 ml. of 6 percent sodium hypochlorite solution. The mixture was stirred for two hours and the solid 3-amino-4-cyano-5-isopropylisothiazole hydrolyzed without further purification.

The following were prepared in this manner:

3-amino-4-cyano-5-isopropylisothiazole, M.P. 83–85°;
3-amino-5-tert-butyl-4-cyanoisothiazole, M.P. 45–50°;
3-amino-4-cyano-5-propylisothiazole, M.P. 123.5–124.5°.

EXAMPLE XIII

3-Amino-5-isopropylisothiazole-4-carboxamide

Eight grams of 3-amino-4-cyano-5-isopropylisothiazole and 67 ml. of concentrated sulfuric acid were mixed, keeping the temperature of the mixture below 50° during addition. The mixture was heated at 55° for two hours and then poured into ice-water. The aqueous solution was adjusted to pH 9 by addition of concentrated ammonium hydroxide. Product was collected by filtration to obtain 8.2 g. of 3 - amino-5-isopropylisothiazole-4-carboxamide, M.P. 197–198.5°.

In the same manner were prepared:

3 - amino-5-propylisothiazole-4-carboxamide, M.P. 161–162°;

3-amino-5-*tert*-butylisothiazole-4-carboxamide, M.P. 118–120°.

Uses of the above-described carboxamides in synthesizing compounds of the present invention are illustrated in the following examples. Oxidation of the dihydro-azolo - [5,4-d]pyrimidinones, as exemplified in Example XXIII, affords a convenient method of synthesis of the corresponding azolo[5,4-d]pyrimidinones, particularly the isothiazolo-[5,4-d]pyrimidinones, not previously described.

EXAMPLE XIV

6-Ethyl-6,7-dihydro-3-propylisoxazolo[5,4-d]pyrimidin-4(5H)-one

To a solution of 9.3 g. of 5-amino-3-propylisoxazole-4-carboxamide and 1 g. of *p*-toluenesulfonic acid in 60 ml. of ethanol was added 4.9 g. of acetaldehyde and the solution was heated under reflux for 4 hours, then allowed to stand at room temperature overnight. The mixture was concentrated by evaporation under reduced pressure to give a solid which was repeatedly triturated with hot water. The water extracts were chilled and the solid which separated was collected. Recrystallization of the solid from ethanol-water gave 4.2 g. of 6-ethyl-6,7-dihydro-3-propyl-isoxazolo[5,4-d]pyrimidin - 4(5H)-one, M.P. 140–141°. The NMR spectrum was consistent with the assigned structure.

*Analysis.*—Calc'd for $C_{10}H_{15}N_3O_2$: C, 57.40; H, 7.23; 6-7-Dihydro-3,6-diisopropylisoxazolo[5,4-d]pyrimidin-

EXAMPLE XV 6,7-Dihydro-3,6-diisopropylisoxazolo[5,4-d]pyrimidin-4-(5H)-one

According to the method of Example XIV, a mixture of 5.1 g. of 5-amino-3-isopropylisoxazole-4-carboxamide, 4.4 g. of isobutyraldehyde and 0.5 g. of *p*-toluenesulfonic acid in 30 ml. of ethanol was heated under reflux for three hours. The mixture was cooled to room temperature and concentrated by evaporation under reduced pressure to give a solid. Recrystallization of the solid from ethanol gave 5.1 g. of 6,7-dihydro-3,6-diisopropylisoxazolo[5,4-d]pyrimidin-4(5H)-one, M.P. 179–189°. The NMR spectrum of the product was consistent with the assigned structure.

*Analysis.*—Calc'd for $C_{11}H_{17}N_3O_2$: C, 59.17; H, 7.67; N, 18.82. Found: C, 58.85; H, 7.66; N, 18.40.

EXAMPLE XVI 3,6-Diethyl-6,7-dihydroisothiazolo[5,4-d]pyrimidin-4(5H)-one

A solution of 20 g. of 5-amino-3-ethylisothiazole-4-carboxamide. 13.4 g. of propionaldehyde and 1 g. of *p*-toluenesulfonic acid in 150 ml. of ethanol was heated under reflux for three hours and the mixture was processed as in Example XV to obtain 16.3 g. of 3,6-diethyl-6,7-dihydroisothiazolo[5,4-d]pyrimidin - 4(5H) - one, M.P. 179–181°. The IR and NMR spectra of the product were consistent with the assigned structure.

*Analysis.*—Calc'd for $C_9H_{13}N_3OS$: C, 51.16; H, 6.20; N, 19.89. Found: C, 51.05; H, 6.04; N, 20.03.

EXAMPLE XVII 6,7-Dihydro-6-isopropyl-3-propylisothiazolo[3,4-d]pyrimidin-4(5H)-one A mixture of 5 g. of 3-amino-5-propylisothiazole-4-carboxamide, 2.0 g. of isobutyraldehyde and 0.5 g. of *p*-toluenesulfonic acid in 50 ml. of absolute ethanol was heated under reflux for 24 hours. The mixture was concentrated by evaporation under reduced pressure to give a white solid. Recrystallization of the solid from ethanol gave 5.6 g. of 6,7-dihydro-6-isopropyl-3-propylisothiazolo[3,4-d]pyrimidin-4(5H)-one which, after two recrystallizations from methanol, melted at 211.5–212°. The IR and NMR spectra of the product were consistent with the assigned structure.

*Analysis.*—Calc'd for $C_{11}H_{17}N_3OS$: C, 55.21; H, 7.16; N, 17.56. Found: C, 55.28; H, 7.35; N, 17.76.

EXAMPLE XVIII 6,7-Dihydro-3,6-diisopropylisothiazolo[3,4-d]pyrimidin-4(5H)-one A mixture of 1.8 g. of 3-amino-5-isopropylisothiazole-4-carboxamide, 1.44 g. of isobutyraldehyde and 0.2 g. of *p*-toluenesulfonic acid in 30 ml. of absolute ethanol was heated under reflux for four hours. The mixture was concentrated by evaporation under reduced pressure. An attempt to purify a small amount of the solid by dissolution in hot aqueous alkali followed by liberation with acid was found to result in its destruction. Recrystallization of the product from toluene-hexane, then from methanol, gave 0.3 g. of 6,7-dihydro-3,6-diisopropylisothiazolo[3,4-d]pyrimidin-4(5H)-one, M.P. 204–212°. The NMR spectrum was consistent with the assigned structure.

*Analysis.*—Calc'd for $C_{11}H_{17}N_3OS$: C, 55.21; H, 7.16; N, 17.56. Found: C, 55.00; H, 7.40; N, 17.39.

EXAMPLE XIX

3-*tert*-Butyl-6-ethyl-6,7-dihydroisothiazolo-[3,4-d]pyrimidin-4(5H)-one

A mixture of 3.0 g .of 3-amino-5-*tert*-butylisothiazole-4-carboxamide, 1.26 g. of propionaldehyde and 0.5 g. of *p*-toluene sulfonic acid in 40 ml. of ethanol was heated under reflux for 4 hours. The mixture was cooled to −35° and the separated solid collected by filtration and dried. Recrystallization from ethanol-water, gave 2.5 g. of 3-*tert*-butyl-6-ethyl-6,7 - dihydroisothiazolo[3,4 - d] pyrimidin-4(5H)-one, M.P. 252–253°. The NMR and IR spectra of the product were consistent with the assigned structure.

*Analysis.*—Calc'd for $C_{11}H_{17}N_3OS$: C, 55.21; H, 7.16; N, 17.56. Found: C, 55.40; H, 7.20; N, 17.75.

EXAMPLE XX

3-*tert*-Butyl-6,7-dihydro-6-methylisoxazolo-[3,4-d]pyrimidin-4(5H)-one

A mixture of 5.5 g. of 3-amino-5-*tert*-butylisoxazole-4-carboxamide, 2.7 g. of acetaldehyde and 0.5 g. of *p*-toluenesulfonic acid in 35 ml. of absolute ethanol was heated under reflux for four hours, then stirred at room temperature for about 64 hours. The resulting slurry was cooled to 5° and the solid isolated on a filter to obtain a white solid. Recrystallization from ethanol gave 2.9 g. of 3-*tert*-butyl - 6,7 - dihydro-6-methylisoxazolo-[3,4-d] pyrimidin-4(5H) - one, M.P. 225–227°. The NMR spectrum of the product was consistent with the assigned structure.

*Analysis.*—Calc'd for $C_{10}H_{15}N_3O_2$: C, 57.40; H, 7.23; N, 20.08. Found: C, 57.10; H, 7.19; N, 19.83.

EXAMPLE XXI 6,7-Dihydro-3-isopropyl-6-propylisoxazolo-[5,4-d]pyrimidin-4(5H)-one A mixture of 10.2 g. of 5-amino - 3 - isopropylisoxazole-4-carboxamide, 8.8 g. of butyraldeyde and 1 g. of *p*-toluenesulfonic acid in 60 ml. of ethanol was heated under reflux for 4 hours. The mixture was chilled and the solid isolated on a filter. The filtrate was concentrated by evaporation under reduced pressure and water was added to precipitate the solid, which was collected. Recrystallization of the combined solids from ethanol-water gave 10.3 g. of 6,7-dihydro-3-isopropyl-6-propylisoxazolo-

[5,4-d]pyrimidin-4(5H)-one, M.P. 190–192°. The NMR spectrum of the product was consistent with the assigned structure.

*Analysis.*—Calc'd for $C_{11}H_{17}N_3O_2$: C, 59.17; H, 7.67; N, 18.82. Found: C, 58.89; H, 8.07; N, 18.51.

EXAMPLE XXII

3-*tert*-Butyl-6,7-dihydro-6,6-dimethylisoxazolo-[5,4-d]pyrimidin-4(5H)-one

A mixture of 11.1 g. of 5-amino-3-*tert*-butylisoxazole-4-carboxamide, 7.1 g. of dry acetone and 1 g. of *p*-toluenesulfonic acid in 60 ml. of ethanol was heated under reflux for several hours then stirred at ambient temperature overnight. The separated solid was collected by filtration and recrystallized from acetic acid-water to give after drying at 80° for 3 hours, 5.0 g. of 3-*tert*-butyl-6,7-dihydro-6,6-dimethylisoxazolo[5,4 - d]pyrimidin - 4(5H)-one, M.P. 230–232°. The NMR spectrum of the product was consistent with the assigned structure.

*Analysis.*—Calc'd for $C_{11}H_{17}N_3O_2$: C, 59.17; H, 7.67; N, 18.82. Found: C, 59.37; H, 7.69; N, 18.97.

EXAMPLE XXIII 3,6-Diethylisothiazolo[5,4-d]pyrimidin-4(5H)-one

A mixture of 12.3 g. of 3,6-diethyl-6,7-dihydro-isothiazolo[5,4-d]pyrimidin-4(5H)-one in 200 ml. of 6 percent sodium hypochlorite solution and 200 ml. of ethanol was stirred at room temperature for 15 hours. The red solution was concentrated by evaporation under reduced pressure and the solid residue was dissolved in water. Acidification (pH 2) of the water with 10 percent hydrochloric acid liberated a solid which was collected, washed with water and dried. Recrystallization twice from ethanol gave 7.4 g. of 3,6 - diethylisothiazolo[5,4 - d]pyrimidin-4(5H)-one, M.P. 199–201°. The IR and NMR spectra of the product were consistent with the assigned structure.

*Analysis.*—Calc'd for $C_9H_{11}N_3OS$: C, 51.66; H, 5.30; N, 20.08. Found: C, 51.53; H, 5.23; N, 20.34.

In the manner of Example XIV–XXII were prepared:

EXAMPLE XXIV

6-*tert*-Butyl - 6,7-dihydro - 3 - isopropyl-isothiazolo-[3,4-d]pyrimidin-4(5H)-one, M.P. 230–231°.

EXAMPLE XXV

6-Ethyl-6,7-dihydro - 3 - isopropylisoxazolo - [5,4-d]pyrimidin-4(5H)-one, M.P. 191–193°.

EXAMPLE XXVI

3-*tert*-Butyl - 6 - ethyl-6,7-dihydroisoxazolo-[5,4 - d]-pyrimidin-4(5H)-one, M.P. 208–211°.

EXAMPLE XXVII

3-*tert*-Butyl - 6,6 - diethyl - 6,7-dihydroisoxazolo-[5,4-d]pyrimidin-4(5H)-one, M.P. 199–200°.

EXAMPLE XXVIII

6-Ethyl - 6,7-dihydro - 3 - isopropylisothiazolo-[5,4-d] pyrimidin-4(5H)one, M.P. 168–170°.

EXAMPLE XXIX 6,7 - Dihydro - 6 - isopropyl - 3-propylisothiazolo-[5,4-d]pyrimidin-4(5H)-one, M.P. 163–167°.

EXAMPLE XXX

3-Ethyl-6,7-dihydro-6,6-dimethylisothiazolo - [5,4 - d] pyrimidin-4(5H)-one, M.P. 203–205°.

EXAMPLE XXXI

6-Ethyl - 6,7 - dihydro - 3 - propylisoxazolo-[3,4-d] pyrimidin-4(5H)-one, M.P. 235–237°.

EXAMPLE XXXII 3,6-Di-*tert*-butyl - 6,7 - dihydroisoxazolo-[3,4-d]pyrimidin-4(5H)-one, M.P. 225–227°.

EXAMPLE XXXIII

6-*tert*-Butyl-6,7-dihydro - 3 - propylisoxazolo[3,4-d]pyrimidin-4(5H)-one, M.P. 256–258°.

EXAMPLE XXXIV

6-Ethyl-6,7-dihydro - 3 - isopropylisothiazolo[3,4-d]pyrimidin-4(5H)-one, M.P. 229–231°.

The biological activity of the compounds of this invention was demonstrated in standard herbicidal tests. The test methods and test results were as follows:

For pre-emergence herbicidal tests, the test crop seeds of lima beans (*Phaseoulus lunatus*), corn (*Zea mays*), lettuce (*Lactuca sativa*), mustard (*Brassica juncea*), and crabgrass (*Digitaria sanguinalis*) were planted in shallow flat-bed trays containing two to three inches of a sandy-loam soil. Within twenty-four hours after planting, an aqueous-acetone solution of the compound being tested was sprayed on the soil at a rate of 8 pounds of active ingredient per acre. Test plants were maintained in a greenhouse and watered regularly for two weeks, after which time the phytotoxicity of the compound was recorded. Individual plant species were examined for percent kill and vigor. Untreated control plants were maintained in every test carried out.

Table I lists results of pre-emergence herbicidal testing:

TABLE I.—PRE-EMERGENCE EVALUATION OF COMPOUNDS, 8 LBS./ACRE

| Compound of Ex.— | Test plant species | | | | |
|---|---|---|---|---|---|
| | Lima beans | Corn | Lettuce | Mustard | Crabgrass |
| XIV | 100 | [1]0 | 100 | 100 | 100 |
| XV | 100 | 100 | 100 | 100 | 100 |
| XVI | 100 | 100 | 100 | 100 | 100 |
| XVII | 100 | 100 | 100 | 100 | 100 |
| XVIII [2] | 100 | 100 | 100 | 100 | 100 |
| XIX | 100 | [1]30 | 100 | 100 | 50 |
| XX | 100 | 100 | 100 | 100 | 100 |
| XXI | 100 | [1]0 | 100 | 100 | 100 |
| XXII | 100 | [1]0 | 100 | 100 | 100 |
| XXIV | 100 | 100 | 100 | 100 | 100 |
| XXV | 100 | [1]0 | 100 | 100 | 100 |
| XXVI | 100 | [1]0 | 100 | 100 | 100 |
| XXVII | 0 | 0 | 10 | 30 | 0 |
| XXVIII | 100 | 100 | 100 | 100 | 100 |
| XXIX | 100 | 30 | 100 | 100 | [1]90 |
| XXX | 0 | 0 | 0 | [1]80 | 0 |
| XXXI | 100 | [1]30 | 100 | 100 | 100 |
| XXXII | 100 | 0 | 100 | 100 | 20 |
| XXXIII | 100 | [1]0 | 100 | 100 | 100 |
| XXXIV | 100 | [1]70 | 100 | 100 | 100 |

[1] Plants not killed were severely damaged and will not survive.
[2] At 4 lbs./acre.

For post-emergence herbicidal tests, the test crop seeds were planted in shallow flat-bed trays containing two to three inches of a loam soil. The growth trays were maintained in a greenhouse and watered regularly for approximately two weeks. When the first trifoliate leaves of bean plants were unfolding, the test plants were removed from the greenhouse and sprayed with an aqueous-acetone solution of the compound being tested at a rate of 8 pounds of active ingredient per acre. The plants were maintained in the greenhouse and watered regularly for an additional two weeks, after which time the phytotoxicity of the compound was recorded. Individual plant species were examined for percent kill and vigor. Untreated control plants were maintained in every test carried out.

Table II lists the results of post-emergence herbicidal testing:

TABLE II.—POST-EMERGENCE EVALUATION OF COMPOUNDS, 8 LBS./ACRE

| Compound of Ex.— | Test plant species | | | | |
|---|---|---|---|---|---|
| | Lima beans | Corn | Lettuce | Mustard | Crabgrass |
| XIV | 100 | 0 | 100 | 100 | ¹50 |
| XV | 100 | 100 | 100 | 100 | 100 |
| XVI | 100 | ¹70 | 100 | 100 | 100 |
| XVII | 100 | 100 | 100 | 100 | 100 |
| XIX | 100 | 70 | 100 | 100 | 100 |
| XX | 100 | 100 | 100 | 100 | 100 |
| XXI | 100 | 0 | 100 | 100 | 100 |
| XXII | 100 | 0 | 100 | 100 | 0 |
| XXIV | 100 | 100 | 100 | 100 | 100 |
| XXV | 100 | 100 | 100 | 100 | 100 |
| XXVI | 100 | 100 | 100 | 100 | 100 |
| XXVII | ¹50 | 0 | 100 | 100 | 50 |
| XXVIII | ¹80 | 0 | 100 | 100 | 100 |
| XXIX | 30 | 0 | 100 | 100 | 100 |
| XXX | 50 | 0 | 0 | 0 | 0 |
| XXXI | 100 | 30 | 100 | 100 | 100 |
| XXXII | 100 | 0 | 100 | 100 | 100 |
| XXXIII | 100 | 0 | 100 | 100 | 100 |
| XXXIV | 100 | ¹70 | 100 | 100 | 100 |

¹ Plants not killed were severely damaged and will not survive.

For herbicidal applications, 3,6 - dialkyl-6,7-dihydro-isazolo[3,4-d]pyrimidin-4(5H)-ones may be utilized in diverse formulations, including the agricultural adjuvants and agricultural carriers, i.e. those materials normally employed to facilitate the dispersion of active ingredients in agricultural applications, recognizing the fact that the formulation and mode of application of a toxicant may affect the activity of the material in a given application. Thus, the compounds of this invention may be formulated as a granule of relatively large particle size, as a wettable powder, as an emulsifiable concentrate, as a solution, or as any of several other known types of formulations, depending on the desired mode of application.

Granular formulations are particularly useful for aerial distribution or for penetration of a canopy of foliage. Useful granular formulations may be of several types. Impregnated granules are those wherein the active ingredient is applied to large particles of an absorbent carrier, such as an attapulgite or kaolin clay, corncobs, expanded mica, etc., normally in the form of a solution in a solvent. Surface-coated granules may be produced by spraying the molten active ingredient onto the surface of a generally nonabsorbent particle or by spraying on a solution of active ingredient in a solvent. The core may be water-soluble such as a prilled fertilizer, or insoluble such as sand, marble chips or coarse talc. Particularly useful is a granule wherein a wettable powder is applied as a surface coating to a sand or other insoluble particle such that the wettable may be dispersed on contact of the granule with moisture. Granules may be produced by agglomeration of dusts or powders by compaction rollers, by extrusion through a die or by use of a granulating disc. Granular formulations may vary widely in concentration, with useful formulations containing as little as 0.5% or as much as 95% of active ingredient.

Wettable powders, also useful formulations for both pre- and post-emergence herbicides, are in the form of finely divided particles which disperse readily in water or other dispersants. The wettable powder is ultimately applied to the soil either as a dry dust or as an emulsion in water or other liquid. Typical carriers for wettable powders include fuller's earth, kaolin clays, silicas and other highly absorbent, readily wet inorganic diluents. Wettable powders normally are prepared to contain about 5% to 80% of active ingredient, depending on the absorbency of the carrier, and usually also contain a small amount of a wetting, dispersing or emulsifying agent to facilitate dispersion. For example, a useful wettable powder formulation contains 80.8 parts of 3,6-dialkyl-6,7-dihydro-isazolo[3,4-d]pyrimidin-4(5H)-one. 17.9 parts of palmetto clay, and 1.0 part of sodium lignosulfonate and 0.3 part of sulfonated aliphatic polyester as wetting agents.

Other useful formulations for herbicidal applications are the emulsifiable concentrates, which are homogeneous liquid or paste compositions dispersible in water or other dispersant, and may consist entirely of the compound of this invention with a liquid or solid emulsifying agent, or may also contain an agriculturally acceptable liquid carrier, such as xylene, heavy aromatic naphthas, isophorone and other nonvolatile organic solvents.

Typical wetting, dispersing or emulsifying agents used in agricultural formulations include, for example, the alkyl and alkylaryl sulfonates and sulfates and their sodium salts; polyethylene oxides; sulfonated oils, fatty acid esters of polyhydric alcohols; and other types of surface-active agents, many of which are available in commerce. The surface-active agent, when used, normally comprises from 1% to 15% by weight of the herbicidal composition.

These formulations may be applied without further dilution or as dilute solutions, emulsions or suspensions in water or other suitable diluent. The compositions may be applied to the area wherein control is desired by spraying onto the undesired vegetation or onto the surface of the soil in the case of liquid compositions or by distribution from mechanical equipment in the case of solids. The surface-applied material may also be blended into the upper layer of soil by cultivation, or left as applied, as is appropriate to gain the optimum results with the particular treatment.

The active herbicidal compound of this invention may be formulated and/or applied with insecticides, fungicides, nematicides, plant-growth regulators, fertilizers, and other agricultural chemicals. In applying the active compound of this invention, whether formulated alone or with other agricultural chemicals, an effective amount and concentration of 3,6 - dialkyl-6,7-dihydroisazolo[3,4-d]pyrimidin-4(5H)-one are of course employed.

It is apparent that various modifications may be made in the formulation and application of the novel compounds of this invention, without departing from the inventive concept herein, as defined in the following claims.

We claim:
1. A substituted isazolopyrimidine of the formula:

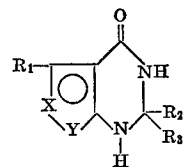

wherein $R_1$ and $R_2$ are the same or different members of the group consisting of alkyl radicals of 1 to 4 carbon atoms, $R_3$ is hydrogen or methyl or ethyl radical, X is a member of the group consisting of N, O, and S, and Y is a member of the group consisting of O and S when X is N, and Y is N when X is O or S.

2. A substituted isoxazolopyrimidine of claim 1 wherein X is N and Y is O.

3. The compound of claim 2 which is 6,7-dihydro-3,6-diisopropylisoxazolo[5,4-d]pyrimidin-4(5H)-one.

4. A substituted isothiazolopyrimidine of claim 1 wherein X is N and Y is S.

5. The compound of claim 4 which is 3,6-diethyl-6,7-dihydroisothiazolo[5,4-d]pyrimidin-4(5H)-one.

6. A substituted isoxazolopyrimidine of claim 1 wherein X is O and Y is N.

7. The compound of claim 6 which is 3-tert-butyl-6,7-dihydro-6-methylisoxazolo[3,4-d]pyrimidin-4(5H)-one.

8. A substituted isothiazolopyrimidine of claim 1 wherein X is S and Y is N.

9. The compound of claim 8 which is 6,7-dihydro-6-isopropyl - 3 - propylisothiazolo[3,4-d]pyrimidin-4(5H)-one.

References Cited
UNITED STATES PATENTS 2,075,359    3/1937    Saltzberg et al.    260—256.4
3,679,682    7/1972    Gibbons    260—256.4

NICHOLAS S. RIZZO, Primary Examiner

R. V. RUSH, Assistant Examiner

U.S. Cl. X.R.

71—90, 92; 260—256.5 R, 465.4, 465.6, 465.7, 465.8, 566 A, 306.8 A, 307 H

UNITED STATES PATENT OFFICE
CERTIFICATE OF CORRECTION

PATENT NO. : 3,816,421
DATED : June 11, 1974
INVENTOR(S) : L. K. Gibbons and A. A. Ramsey It is certified that error appears in the above-identified patent and that said Letters Patent are hereby corrected as shown below:

Column 1, line 17, change "3,5-dialkyl-" to ---3,6-dialkyl- ---.

Column 1, word bridging lines 18-19 should be ---exhibit---.

Column 1, line 21, before "tert-butyl-", insert -- 3- --.

Column 3, line 29, after "and", second occurrence, insert ---of---

Column 3, line 74, change "caid" to ---acid---.

Column 4, line 59, change "19" to ---179---.

Column 5, word bridging lines 65-66 should be --- -ethylisothia

Column 7, line 11, change "EXAMPLES" to ---EXAMPLE---.

Column 9, delete line 36, insert ---N, 20.08.
  Found:  C, 57.67; H, 7.20; N, 20.23.---.

Column 11, line 16, after "give", insert comma.

Signed and Sealed this sixteenth Day of December 1975

[SEAL]

Attest:

RUTH C. MASON
Attesting Officer

C. MARSHALL DANN
Commissioner of Patents and Trademarks